Oct. 11, 1949.　　　　T. O. WOODIN　　　2,484,140
AUTOMATICALLY ADJUSTABLE SICKLE BAR
Filed June 13, 1947　　　　　　　　2 Sheets-Sheet 1

Inventor
Truman O. Woodin
By Clarence A. O'Brien
and Harvey B. Jackson
Attorneys Inventor
Truman O. Woodin Patented Oct. 11, 1949

2,484,140

UNITED STATES PATENT OFFICE 2,484,140

AUTOMATICALLY ADJUSTABLE SICKLE BAR

Truman O. Woodin, Laurens, Iowa

Application June 13, 1947, Serial No. 754,329

2 Claims. (Cl. 56—303)

The present invention relates to new and useful improvements in combines and more particularly to a floating support in the form of a skid bar for the sickle bar to ride along the surface of the ground to compensate for irregularities in the ground surface and thus automatically maintain the sickle at a uniform cutting depth.

An important object of the invention is to provide an attachment for combines to accomplish the aforesaid purpose which is secured in position to the sickle bar without necessitating any changes or alterations in the construction thereof.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
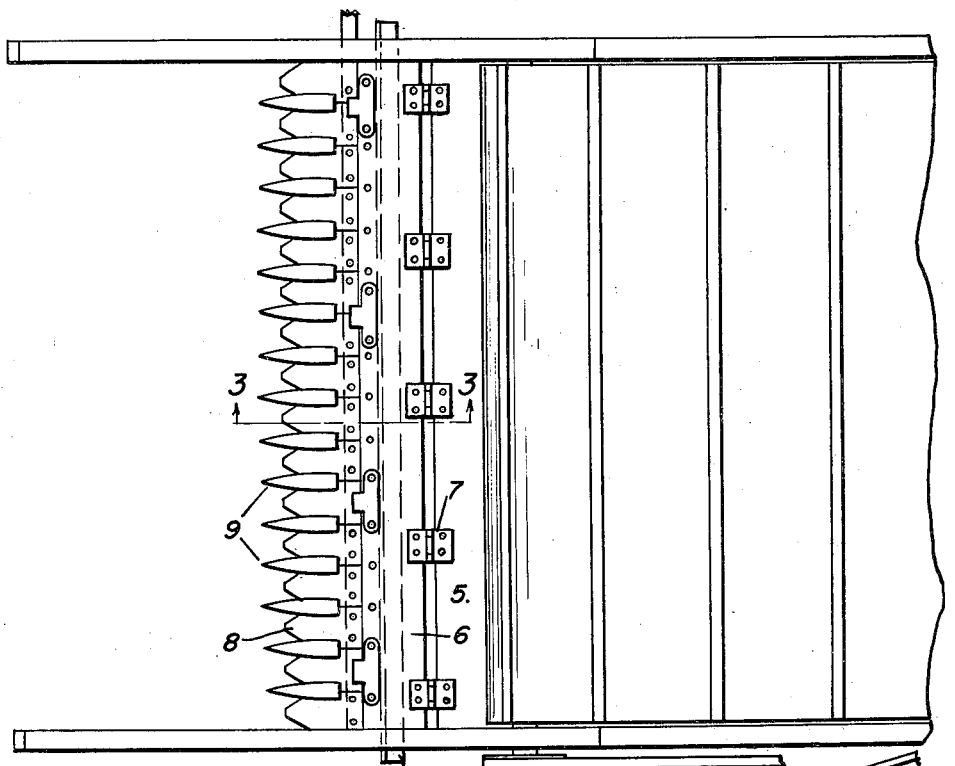
Figure 1 is a top plan view.
Figure 2:
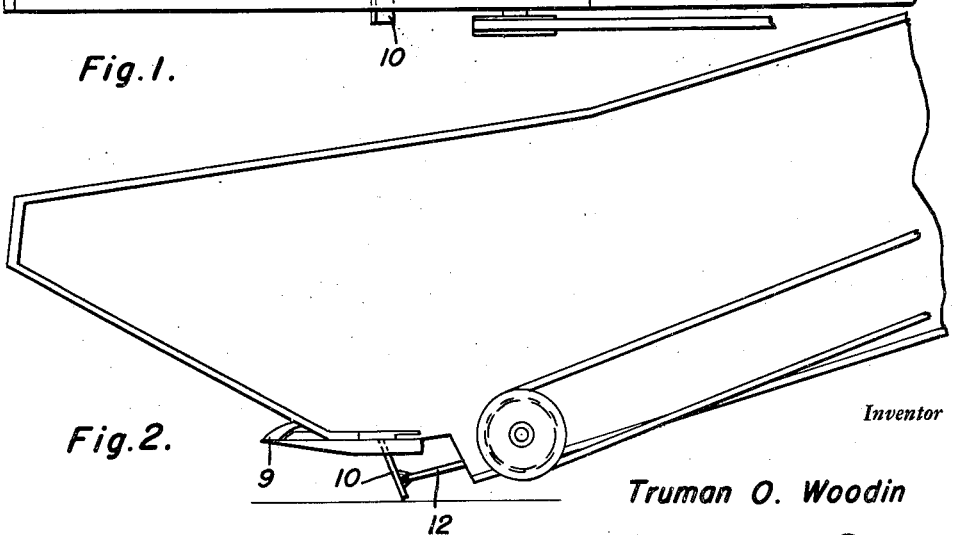
Figure 2 is a side elevational view.
Figure 3:
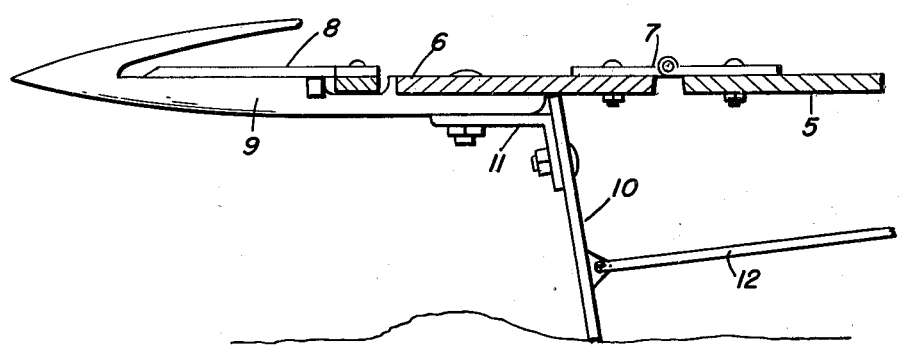
Figure 3 is an enlarged fragmentary sectional view taken on a line 3—3 of Figure 1.
Figure 4:
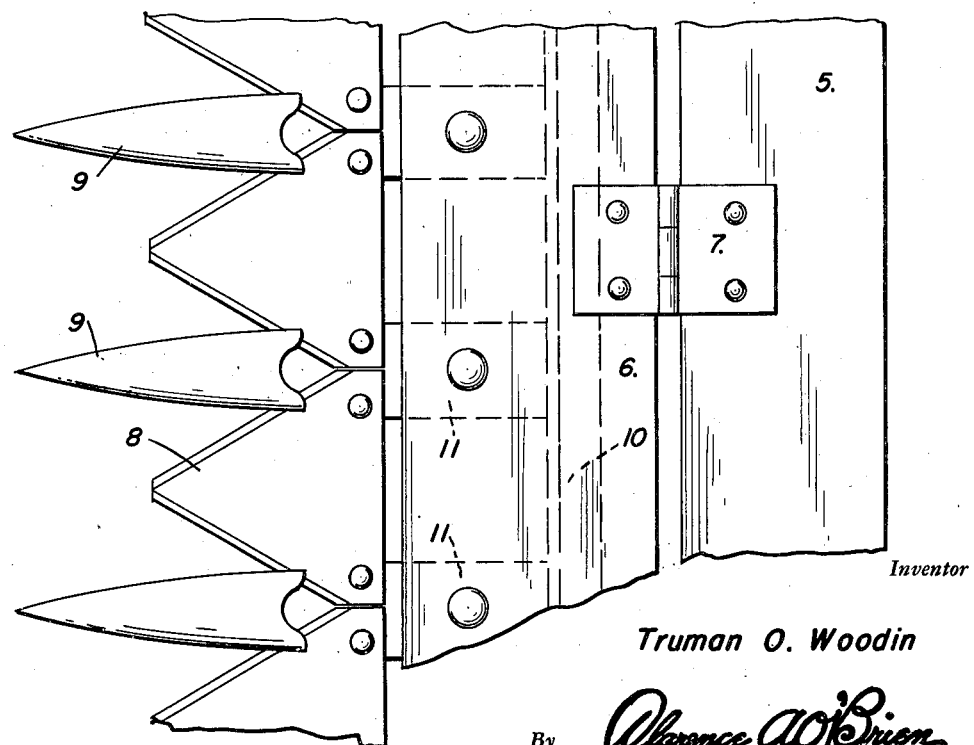
Figure 4 is an enlarged fragmentary top plan view.

Referring now to the drawings in detail wherein for the purpose of illustration I have disclosed a preferred embodiment of my invention, the numeral 5 designates the usual platform of a combine to the front edge of which the sickle bar 6 is attached for vertical swinging movement by means of conventionel hinges 7. The sickle is shown at 8 working on the guards 9.

Usually the sickle and guard are adjusted vertically from time to time by a lever to regulate the cutting depth of the sickle and because the surface of the soil is nearly always irregular, it is practically impossible to cut the crop a uniform height above the ground, thus losing much of the close growing crops.

To overcome this objection, I provide a bar 10 which is secured in a transverse position to the underside of the sickle bar 6 by angle brackets 11, the bar 10 being supported in an edgewise upright position and slightly inclined rearwardly to slide along the surface of the ground and to support the sickle above the ground. Accordingly, the sickle will be automatically raised and lowered to compensate for surface irregularities and thus cut the crop at a uniform height.

The sickle bar is usually adjusted vertically by means of a conventional hydraulic lift (not shown) and which is attached to the bar 10 by a rod 12, the lift permitting free movement of the sickle bar within a limited range, such as when striking an obstruction. Accordingly, in the operation of the device, the sickle bar, being supported on the bar 10 in a substantially floating action, will rise and fall in accordance with the contour of the ground to maintain the sickle at a uniform height relative to the ground.

Having described the invention, what is claimed as new is:

1. An automatically adjustable support for the sickle of a combine and comprising a ground skid attached to the underside of a sickle bar to support the sickle at all times at a uniform cutting height above the ground, said ground skid embodying a transverse board positioned edgewise on the ground.

2. An automatically adjustable support for the sickle of a combine and comprising a ground skid attached to the underside of a sickle bar to support the sickle at all times at a uniform cutting height above the ground, said ground skid embodying a transverse board positioned edgewise on the ground and having its lower edge inclined rearwardly.

TRUMAN O. WOODIN.

REFERENCES CITED

The following references are of record in the file of this patent:

UNITED STATES PATENTS

| Number | Name | Date |
|---|---|---|
| 333,124 | Grattan | Dec. 29, 1885 |
| 662,442 | Jennings | Nov. 27, 1900 |